(12) United States Patent
Nguyen et al.

(10) Patent No.: US 7,855,848 B1
(45) Date of Patent: Dec. 21, 2010

(54) HEAD-DISK INTERFERENCE DETECTION USING SPIN MOTOR CURRENT

(75) Inventors: Duong Hong Nguyen, Broomfield, CO (US); Tan Chin Kiong, Singapore (SG); Richard LeSage, Longmont, CO (US); Lee Teng Boon, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 1114 days.

(21) Appl. No.: 11/542,686

(22) Filed: Oct. 2, 2006
(Under 37 CFR 1.47)

Related U.S. Application Data

(60) Provisional application No. 60/722,391, filed on Sep. 30, 2005.

(51) Int. Cl.
*G11B 27/36* (2006.01)
*G11B 21/02* (2006.01)
(52) U.S. Cl. .......................................... 360/31; 360/75
(58) Field of Classification Search ........................ None
See application file for complete search history.

(56) References Cited

U.S. PATENT DOCUMENTS 5,539,592 A * 7/1996 Banks et al. .................. 360/75
5,570,247 A * 10/1996 Brown et al. .................. 360/75
7,095,578 B2 * 8/2006 Ma ............................. 360/75

* cited by examiner

*Primary Examiner*—Daniell L Negrón
(74) *Attorney, Agent, or Firm*—David K. Lucente

(57) ABSTRACT

Detection of head disk interference is provided by monitoring a hard disk drive characteristic related to disk rotation rate. A number of characteristics can indicate HDI. These include the magnitude of decreases in rotation rate, changes in the time-derivative (time-rates of change) of rotation rate or other changes in time-profiles of rotation rate, changes in spin motor current, differences between maximum and minimum values of spin motor current, changes in the time-derivative (time-rates of change) of spin motor current or other changes in time-profiles of spin motor current or combinations or indicators thereof. These approaches to detecting HDI provide several potential advantages. Detection of HDI can be achieved relatively early in a test or other procedure, can be performed relatively rapidly, can distinguish HDI from at least some other anomalies and can indicate the location and/or magnitude of HDI occurrences.

24 Claims, 2 Drawing Sheets ically involves main-
taining the read write head at a preferred location with respect
to the adjacent disk surface. Many hard disks are configured
to provide their best performance when the read write head is
maintained at a distance (or "fly height") from the disk sur-
face of a few nanometers. If the read/write head is located
more than a tolerance amount from the preferred nominal fly
height, there could be loss of data and/or effective loss of data
storage capacity of the disk drive. Further, if the read write
head is sufficiently close to the disk surface, a condition
known as "head-disk interference" (HDI) occurs. Head-disk
interference can (but need not always) involve contact of the
head with the disk surface and has the potential to cause
temporary or permanent physical damage to the HDD.

In many HDD manufacturing processes, attempts are made
to detect whether HDDs that are being manufactured have
occurrences of HDI or other anomalies. The detection of an
anomaly may, depending on severity or other conditions,
result in "failing" the drive. A drive which is "failed" (tagged
as defective) may be subjected to various treatments, includ-
ing removal from the product stream, repair and/or analysis.
While it is useful to identify, during manufacturing, those
HDDs which have occurrences of HDI, the amount of time
involved in such detection can adversely affect the throughput
and/or effective cost per unit of HDD manufacturing. Further-
more, previous HDI detection typically occurred after (or in
conjunction with) a substantial amount of other configuration
or testing procedures. Meaning that, by the time a drive was
"failed" for HDI occurrences, an undesirably large amount of
effort and funds had already been expended on the drive,
again adversely affecting HDD manufacturing throughput
and effective per-unit cost. Accordingly, it would be useful to
provide a method, system and apparatus for detecting HDI
which is of relatively short duration and/or occurs relatively
earlier in the manufacturing process, as compared to previous
approaches.

In some previous approaches, HDDs which had occur-
rences of HDI might be "failed" in a manner that may not
specifically indicate that HDI was the cause of the failure
(such as tests which detect an anomaly that can arise from any
of a number of causes). Such failure data has limited utility in
identifying possible problems in equipment or procedures of
manufacturing. Further, some previous approaches provided
little, if any, information pertinent to the location on the disk
where HDI occurs, and/or the number of HDI occurrences
and/or the severity of HDI. Thus, these approaches provided
little information usable in deciding the disposition of the
failed drive (repair, disassemble and use selected parts, scrap,
etc.). Accordingly it would be useful to provide a method,
system and apparatus which can distinguish HDI occurrences
from other sources of failure or potential failure, and/or can
provide information regarding the location of, number of,
and/or severity of HDI occurrences.

SUMMARY OF THE INVENTION

The present invention includes a recognition and/or appre-
ciation of the existence, source and/or nature of problems in
previous approaches, including those described herein.

One embodiment of the invention involves detecting HDI
using information generally indicative of disk rotation rate. It
has been found that HDIs are typically associated with a
change in, or a tendency for change in, disk rotation rate.
Without wishing to be bound by any theory, it is believed that

HEAD-DISK INTERFERENCE DETECTION USING SPIN MOTOR CURRENT

CROSS-REFERENCE TO RELATED APPLICATIONS

Priority is claimed from U.S. Provisional Application Ser. No. 60/722,391 filed Sep. 30, 2005, which is incorporated herein by reference.

FIELD OF THE INVENTION

The present invention is directed to detection of head-disk interference in a disk drive. In particular, the present invention is directed to detection of head-disk interference using a characteristic of disk location, such as the profile (or other feature) of the spin motor current.

BACKGROUND INFORMATION

Data storage devices including, e.g., those normally pro-
vided as part of, or in connection with, a computer or other
electronic device, can be of various types. In one general
category, data is stored on a rotating (or otherwise movable)
data storage medium. A read head, a write head and/or a
read/write head is positioned adjacent desired locations of the
medium for writing data thereto or reading data therefrom.
The head may include separate or integrated read and write
elements. One common example of a data storage device of
this type is a disk drive (often called a hard disk drive, "HDD,"
or "fixed" disk drive).

Typically, the information is stored on each disk in nomi-
nally concentric tracks, which are divided into sectors. The
read/write head (or transducer) is mounted on an actuator arm
capable of moving the head to access various radial positions
of the disk. Accordingly, the movement of the actuator arm
allows the head to access different tracks. The disk is rotated
by a spindle motor at a high speed, allowing the head to access
different sectors on the disk.

Although many concepts and aspects pertaining to the
present invention will be described herein in the context of a
disk drive, those skilled in the art, after understanding the
present disclosure, will appreciate that advantages provided
by the present invention are not necessarily limited to disk
drives.

In an idealized drive configured with nominally concentric
data tracks, if a read/write head is kept a constant radial
distance from the (nominal) axis of rotation, there will be no
change in the radial distance (if any) from the read/write head
to the desired data track, as the disk rotates. In actuality,
however, many factors can contribute to deviations from this
ideal condition such that small tracking correction forces
must be applied to the read/write head to maintain the head
sufficiently aligned with a desired data track, as the disk
rotates, although some amount of tracking error can be toler-
ated. Most modern disk drives provide a servo tracking sys-
tem for seeking a target track and/or making tracking correc-
tions to assist in maintaining tracking within acceptable
ranges.

Typically, as part of a manufacturing or setup procedure
(prior to normal use for data read/write), a hard disk drive is
provided with a plurality of servo "bursts," markers or sectors.
The purpose of these bursts is to provide location information
to components of the head-positioning and/or tracking sys-
tem. Generally, a plurality of servo bursts are positioned
around a given track. Typically, over various portions
("zones") of the radial extent of the disk, the bursts are cir-
cumferentially aligned, from one track to the next, defining a
plurality of servo "wedges."

Proper operation of a disk drive typ when the read/write head is undesirably close to the disk surface, there is an increase in the (aerodynamic and/or frictional) drag force which tends to resist rotation. Such increase in drag will, unless compensated, slow the rotation rate of the disk. Accordingly, in one embodiment, disk rotation rate (e.g., revolutions per minute (RPM)) is directly or indirectly monitored and any decreases (e.g., of a magnitude more than a threshold magnitude) and/or changes (e.g., differences between minimum and maximum amounts) in RPM and/or rates of change of RPM are used as at least partial indicators of HDI.

Many HDDs rotate the disk using a spin motor. Typically, a servo loop is provided, using any of a number of servo loop designs, as will be understood by those of skill in the art. Typically, a servo loop responds to a detected change in disk rotation rate (or an indication thereof) by adjusting the magnitude of the current (or other electrical parameter) supplied to the spin motor. For example, in some situations, a normal spin current value might be in range of about 300 milliamps to 500 milliamps. Many servo systems have a very rapid response and will compensate for any decrease in RPM (such as may be induced by HDI) almost immediately. According to one embodiment of the invention, the magnitude of the supplied spin motor current is monitored while the actuator arm is controlled to perform one or, preferably, more sweeps, at a substantially constant sweep rate, across the radial extent of the disk. Increases, e.g., above a threshold, and/or differences (e.g., between maximum and minimum values during the sweep) and/or rates of change, in spin motor current, especially if substantially localized over a portion of the radial sweep, are taken as indicative of HDI. Generally, any single sweep will be used for detecting HDI only over a (generally spirally-shaped) portion of the disk surface. Thus, multiple sweeps can be used to detect HDI over substantially the entire disk surface. Preferably, the circumferential and/or radial locations of HDI occurrences are recorded.

It is possible to use spin current or other characteristics related to disk rotation rate, without necessarily performing data read/write prior to, or as part of the test. Thus, HDI detection procedures can be of relatively short duration and can be performed relatively early (e.g., prior to one or more procedures which involve reading or writing data to the disk).

In one embodiment of the invention, detection of head disk interference is provided by monitoring a hard disk drive characteristic related to disk rotation rate. A number of characteristics can indicate HDI. These include the magnitude of decreases in rotation rate, changes in the time-derivative (time-rates of change) of rotation rate or other changes in time-profiles of rotation rate, changes in spin motor current, differences between maximum and minimum values of spin motor current, changes in the time-derivative (time-rates of change) of spin motor current or other changes in time-profiles of spin motor current or combinations or indicators thereof. These approaches to detecting HDI provide several potential advantages. Detection of HDI can be achieved relatively early in a test or other procedure, can be performed relatively rapidly, can distinguish HDI from at least some other anomalies and can indicate the location and/or magnitude of HDI occurrences.

DETAILED DESCRIPTION OF THE PREFERRED EMBODIMENTS

Figure 1:
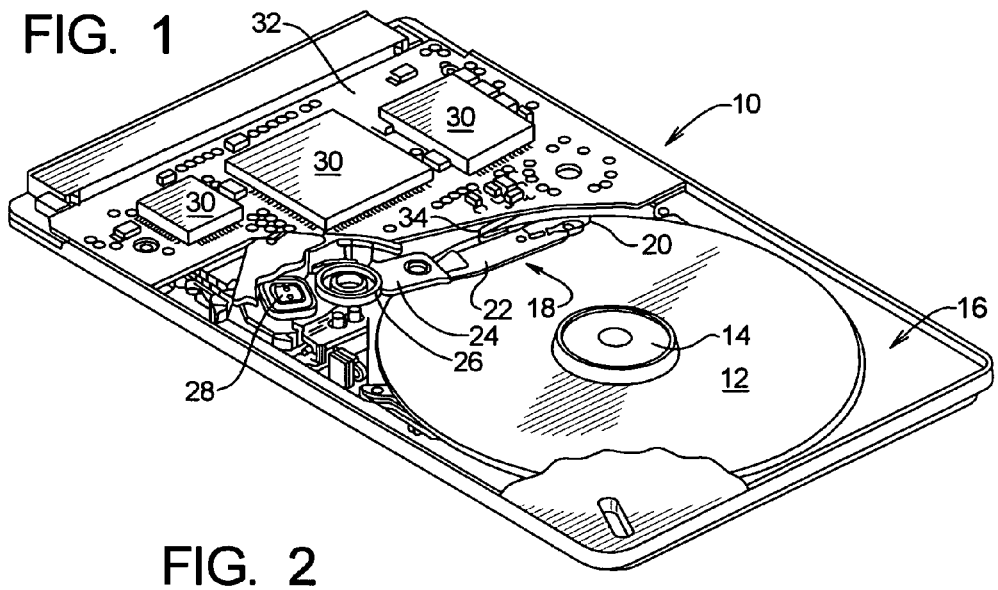
FIG. 1 is a perspective, partially broken-away view of a hard disk drive of a type which can be used in connection with embodiments of the present invention.

A disk drive 10 is illustrated in FIG. 1. The disk drive comprises a disk 12 that is rotated by a spin motor 14. The spin motor 14 is mounted to a base plate 16. The disk drive 10 also includes an actuator arm assembly 18 having a head 20 (or transducer) mounted to a flexure arm 22, which is attached to an actuator arm 24 that can rotate about a bearing assembly 26 that is attached to the base plate 16. The actuator arm 24 cooperates with a voice coil motor 28 in order to move the head 20 along an arcuate path relative to the disk 12. The spin motor 14, voice coil motor 28 and head 20 are coupled to a number of electronic circuits 30 mounted to a printed circuit board 32. In some configurations, the coupling includes a ribbon-like flexure connection 34 having a plurality of conductive traces. The electronic circuits 30 typically include a read channel chip, a microprocessor-based controller and a random access memory (RAM) device. Instead of a single actuator arm, there may be more than one, such as one actuator arm for each side of the disk. Instead of a one-disk configuration (shown in FIG. 1), the disk drive 10 may include a plurality of disks 12 and, therefore, a plurality of corresponding actuator arm assemblies 18.

In many HDD manufacturing processes, certain of the HDD testing procedures are performed in conjunction with servo track writing, such as while the HDD is coupled to a servo track writer (STW). Some of the testing which is performed according to previous approaches, typically in conjunction with servo track writing processes, includes a process generally as depicted in FIG. 2.

The first step is a spin up of the drive 212, i.e., activating the spin motor until it achieves a stable target rotation rate. This is followed by servo positioning the actuator 214. The next test 216, which is sometimes called the "best head test" is performed. Running the test 218 involves writing and reading back data. This is performed at various locations of the disk, preferably over substantially the majority of the disk surface. During the best head test 216, the system obtains performance data (such as error rates, signal strengths and the like). The "best head test" 216 is typically looped 222 until such time as sufficient data is obtained 224 to reliably pass or fail the drive 226. If the drive is not failed 228, additional procedures are typically performed, such as writing clock bits 232 and/or writing certain servo data 234. An exemplary best head test can be found in U.S. patent application Ser. No. 10/860,603 filed Jun. 2, 2004, which is incorporated by reference.

Although occurrences of head disk interference can result in the "best head test" failing the drive 228, there are also other items which can cause or contribute to failing the drive, such as improperly functioning heads, or malfunction in the servo track writer apparatus. Accordingly, the fact of failing the drive as a result of the "best head test" did not, in previous approaches, necessarily indicate the occurrence of HDI.

Figure 2:
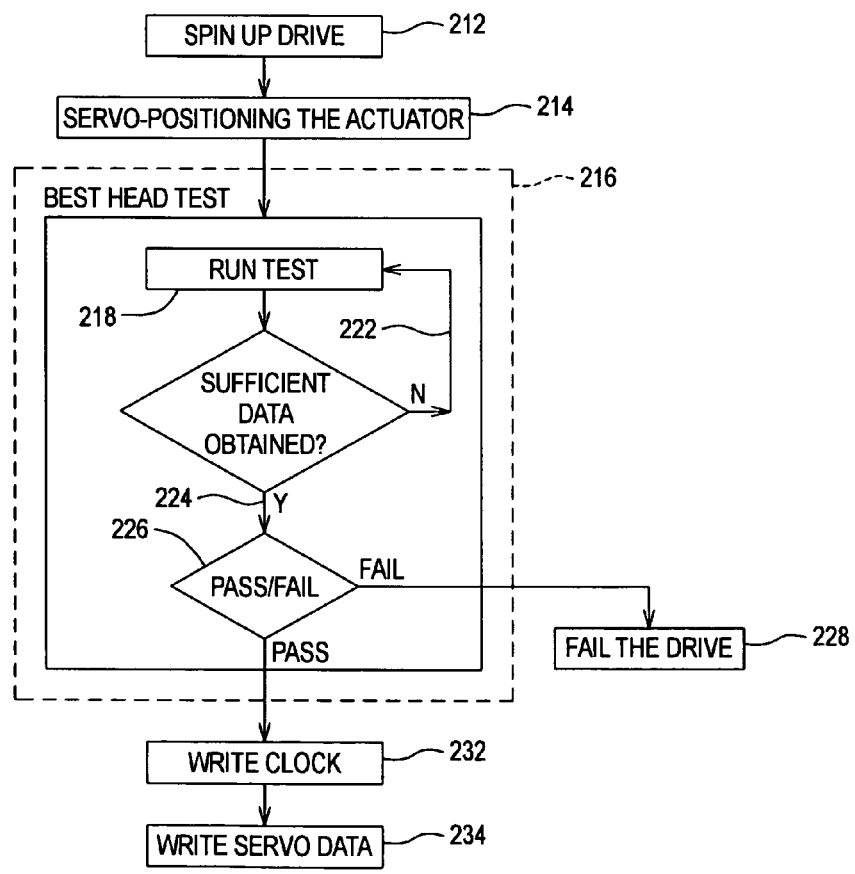
FIG. 2 is a flowchart of a process according to previous approaches.

As seen from FIG. 2, in previous approaches, when the drive is failed 228 whether because of the occurrence of HDIs (or other causes), such failing of the drive occurred only relatively late in the process flow, and specifically only after performance of the "best head test" 216. The fact that failing the drive 228 occurs after the "best head test" 216 is even more problematic because the "best head test" can be of a relatively long duration, e.g., because of the fact that it involves time-consumptive read and write operations and/or involves looping 222 as needed to achieve sufficient data.

Figure 3:
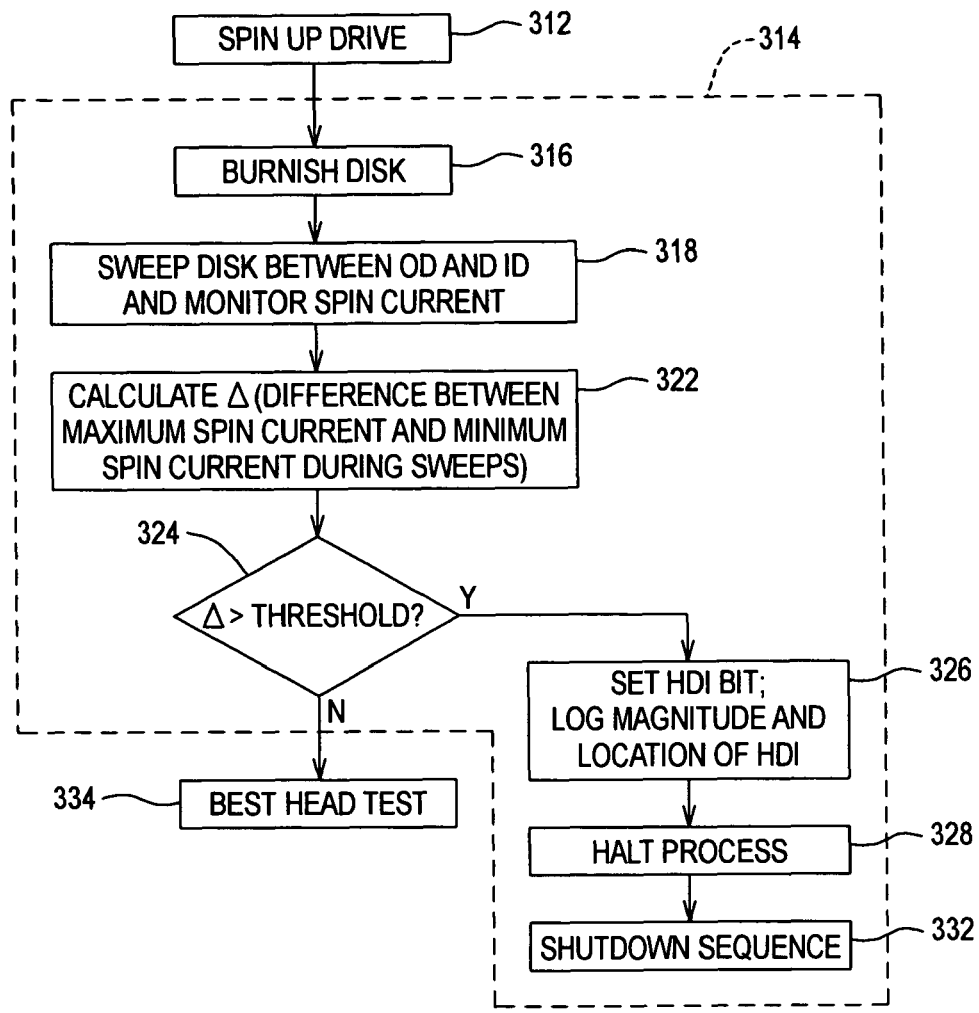
FIG. 3 is a flowchart of a process according to one embodiment of the present invention.

FIG. 3 illustrates a procedure, according to an embodiment of the present invention, which can provide at least some HDI testing prior to and/or without the need for performing a "best head test," and which can at least partly distinguish between failures arising from HDI and those arising from other causes. The procedure of FIG. 3 typically has a shorter duration than a "best head test," and can provide information about the location and/or severity of HDI.

According to the embodiment depicted in FIG. 3, HDI detection 314 is performed immediately following spin up 312. Thus, in the configuration of FIG. 3, it is not necessary to perform the "best head test" in order to detect HDI. Indeed, in the procedure of FIG. 3, HDI detection 314 is performed prior to the time a "best head test" 334 would be performed. Preferably, some or all steps of the procedure of FIG. 3 are performed using a programmed microprocessor.

As part of the HDI detect 314, optionally, the disk is burnished 316 (e.g., to remove or accommodate for thermal asperities, as understood by those skilled in the art). The procedure 314 then provides for sweeping the disk (i.e., substantially continuously moving the head along its arcuate path) substantially between the outer diameter and inner diameter, while monitoring the spin current 318. The difference ($\Delta$) is calculated between the maximum spin current and the minimum spin current during the sweeps 322.

In the procedure of FIG. 3, the occurrence of HDI is indicated if the magnitude of $\Delta$ exceeds a threshold 324. For example, a threshold value of about 10% above or below normal values of $\Delta$ can be used. In this case, an "HDI bit" is set and an indication of the magnitude (such as the value of $\Delta$) and the location of the HDI(s) (such as the location or locations of the head at the time the greatest excursion of spin current occurs) is logged or stored in a memory. In the embodiment of FIG. 3, the process is halted and a shut-down sequence is performed. In cases where the HDI detection is performed during a servo track writing process, it is the STW process that is halted 328 and an STW shut down sequence 332 is performed.

In one embodiment, different procedures can be followed depending on the magnitude of the HDI. For example, the procedure can be configured to fail the drive if $\Delta$ exceeds the threshold by 50% or more, but to merely set the flag and, thereafter, to monitor the spin current, if $\Delta$ exceeds the threshold by more than 10% but less than 50%.

If the value of $\Delta$ does not exceed the threshold, then the procedure can go forward, e.g., by performing a "best head test" 334. In this way, if a drive failure is declared, it will be known whether the failure occurred as a result of detection of a HDI 326 or from some other cause such as a bad head or the like, e.g., which occurred during the "best head test."

Features of the procedure of FIG. 3 are preferably configurable. For example, user-definable aspects preferably include features such as the number of sweeps 318, the value of the threshold 324 and the like.

Preferably, the number of sweeps is selected to provide coverage of substantially the entire disk surface, while avoiding consuming more time than necessary. Typically, the number of sweeps will be dependent on the features of the particular model of disk drive being processed.

Although FIG. 3 depicts using a particular electrical characteristic (namely, the magnitude of $\Delta$) as an indicator of HDI, it is possible to use other indicators without the need to (first) perform or initiate a "best head test." For example, HDI can be indicated by the value of the spin current (rather than $\Delta$) exceeding (or falling below) a threshold value. HDI can be indicated by the presence of a particular time profile of spin current (or values derived from or related thereto), such as the time rate of change of spin current (di/dt). HDI can be indicated by changes in, or values of, RPM of the disk and the like.

A number of variations and modifications of the invention can also be used. Although the invention has been described in the context of detecting HDI during servo tests and servo writing procedures, it is possible to use some or all aspects of the present invention in other situations, including during normal use of the disk drive. Although procedures have been depicted and described in connection with embodiments of the present invention, it is possible to use other procedures in connection with the present invention including procedures having more or fewer steps and/or procedures in which steps are performed in an order different from those depicted.

In light of the above description, a number of advantages of the present invention can be seen. The present invention can make it possible to achieve early detection of HDI, e.g., without the need to first wait until the initiation of a "best head test." The present invention can achieve HDI detection more rapidly than at least some previous approaches, such as without the need to perform time-consumptive procedures such as the read and write procedures involved in the "best head test." For example, in one configuration, HDI detection procedures can be performed in less than about 4 seconds.

The present invention can provide an indication of the location of HDI occurrences, e.g., allowing problem areas of the disk to be quarantined or remapped.

The present invention makes it possible to distinguish, particularly to distinguish early in a testing procedure, HDI from other anomalies. Early detection of HDI and/or detection of the severity of HDI increases the ability to select appropriate action upon detection of HDI (e.g., such as deciding whether to remap portions of the drive, downgrade the drive, fail the drive and/or reuse some or all portions of the drive, or rebuild the drive). The present invention can shorten the time a servo track writer or other device or procedure takes to detect a bad drive due to HDI. The present invention can be used (e.g., as part of a statistical process control) to monitor the drive build process (e.g., to halt the build process whenever the number of failures of this test exceeds a pre-defined control limit). The present invention can be used as an indicator of the status of a particular STW or other apparatus. For example, an auto shut down trigger can be activated if a particular STW on a production line has more than a pre-defined number of HDI failures within a given time interval.

The present invention, in various embodiments, includes components, methods, processes, systems and/or apparatus substantially similar to those depicted and described herein, including various embodiments, sub-combinations, and subsets thereof. Those skilled in the art will understand how to make and use the present invention after understanding the present disclosure. The present invention, and various embodiments, includes providing the devices and processes in the absence of items not depicted and/or described herein or in various embodiments hereof, including in the absence of such items as may have been used in previous devices or processes, e.g., for improving performance, achieving ease of implementation and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the forms or form disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An apparatus, comprising:
    first circuitry which is configured to monitor at least maximum and minimum spin motor currents; and
    second circuitry which outputs at least a first signal indicative of head-disk interference (HDI), in response to at least a first change in a difference between maximum and minimum spin motor currents.

2. The apparatus as claimed in claim 1, wherein at least one of said first and second circuitry comprises a programmed microprocessor.

3. The apparatus as claimed in claim 1, wherein said first and circuitry operate during a servo track writing process.

4. The apparatus as claimed in claim 1, wherein said first and second circuitry operate during read/write operation of an HDD.

5. The apparatus as claimed in claim 1, wherein said first change comprises said difference exceeding at least a first threshold.

6. The apparatus as claimed in claim 1, wherein said second circuitry is configured to respond to said first change without the need to first initiate a "best head test" of said HDD.

7. The apparatus as claimed in claim 1, wherein said second circuitry is configured to respond to said first change without the need to perform data read/write.

8. The apparatus as claimed in claim 1, further comprising circuitry which stores an indication of the location of said head when said first change occurs.

9. The apparatus as claimed in claim 1, further comprising circuitry which stores an indication of the magnitude of HDI.

10. The apparatus of claim 1, wherein the first change in the difference between maximum and minimum spin motor currents is calculated by moving a head substantially between an outer diameter and an inner diameter of a disk and measuring the maximum and minimum spin motor current during the moving the head.

11. A method which can detect head-disk interference in an HDD comprising:
    monitoring maximum and minimum spin motor currents; and
    outputting at least a first signal indicative of head-disk interference (HDI), in response to at least a first change in a difference between maximum and minimum spin motor currents.

12. The method as claimed in claim 11, wherein at least said steps of monitoring and outputting are performed during a servo track writing process.

13. The method as claimed in claim 11, wherein at least said steps of monitoring and outputting are performed during read/write operation of an HDD.

14. The method as claimed in claim 11, wherein said first change comprises said difference exceeding at least a first threshold.

15. The method as claimed in claim 11, further comprising:
    performing said steps of monitoring and outputting without the need to first initiate a best head test of said HDD.

16. The method as claimed in claim 11, further comprising:
    performing said steps of monitoring and outputting without the need to perform data read/write.

17. The method as claimed in claim 11, further comprising:
    storing an indication of the location of said head when said first change occurs.

18. The method as claimed in claim 11, further comprising:
    storing an indication of the magnitude of HDI.

19. The method of claim 11, wherein the first change in the difference between maximum and minimum spin motor currents is calculated by moving a head substantially between an outer diameter and an inner diameter of a disk and measuring the maximum and minimum spin motor current during the moving the head.

20. An apparatus which can detect head-disk interference in an HDD comprising:
    means for monitoring at least maximum and minimum spin motor currents; and
    means for outputting at least a first signal indicative of head-disk interference (HDI), in response to at least a first change in a difference between maximum and minimum spin motor currents.

21. The apparatus as claimed in claim 20, wherein said first change comprises:
    said difference exceeding at least a first threshold.

22. The apparatus as claimed in claim 20, further comprising:
    means for storing an indication of the location of said head when said first change occurs.

23. The apparatus as claimed in claim 20, further comprising:
    means for storing an indication of the magnitude of HDI.

24. The apparatus of claim 20, wherein the first change in the difference between maximum and minimum spin motor currents is calculated by moving a head substantially between an outer diameter and an inner diameter of a disk and measuring the maximum and minimum spin motor current during the moving the head.

* * * * *